United States Patent [19]

King et al.

[11] Patent Number: 5,187,470
[45] Date of Patent: Feb. 16, 1993

[54] PAGING SYSTEM WITH LOCAL CHANNEL LISTS

[75] Inventors: Randolph E. King, Beaverton; Garold B. Gaskill, Tualatin, both of Oreg.

[73] Assignees: Seiko Corp.; Seiko Epson Corp., both of Japan

[21] Appl. No.: 668,368

[22] Filed: Mar. 13, 1991

Related U.S. Application Data

[63] Continuation of Ser. No. 367,207, Jun. 16, 1989, abandoned, which is a continuation-in-part of Ser. No. 352,635, May 12, 1989, Pat. No. 4,897,835, which is a continuation of Ser. No. 121,139, Nov. 16, 1987, abandoned, which is a continuation-in-part of Ser. No. 802,844, Nov. 27, 1985, Pat. No. 4,713,808.

[51] Int. Cl.$^5$ .............................................. H04Q 7/00
[52] U.S. Cl. ...................... 340/825.440; 340/825.47; 455/186.1; 455/33.2
[58] Field of Search ............ 340/825.44, 825.47, 340/825.48, 825.03, 825.01; 455/54, 62, 103, 182, 185, 54.1, 182.1, 185.1, 186.1, 33.1, 33.2; 379/57, 58

[56] References Cited

U.S. PATENT DOCUMENTS

| | | | |
|---|---|---|---|
| 4,253,194 | 2/1981 | Van Deursen | 455/185 |
| 4,392,242 | 7/1983 | Kai | 340/825.44 |
| 4,398,192 | 8/1983 | Moore et al. | 340/825.44 |
| 4,419,765 | 12/1983 | Wycoff et al. | 455/343 |
| 4,644,347 | 2/1987 | Lucas et al. | 340/825.44 |
| 4,802,240 | 1/1989 | Yamaguchi et al. | 455/343 |
| 4,849,750 | 7/1989 | Andros et al. | 340/825.48 |
| 4,888,815 | 12/1989 | Ahlemeyer et al. | 455/186.2 |

Primary Examiner—Donald J. Yusko
Assistant Examiner—Peter S. Weissmann
Attorney, Agent, or Firm—Elmer Galbi

[57] ABSTRACT

A page receiver is provided a list of alternative paging channels to which it can tune if the paging channel presently being received becomes unreliable. This list, and other lists used by paging receivers in the other geographical areas, are disseminated by linked paging transmitters that broadcast identical paging signals throughout a large geographical area. When a paging receiver finds a channel carrying paging data, it identifies which of the plurality of transmitted lists is appropriate for its use by finding the list that references the channel to which the receiver is presently tuned. The channels referenced in the identified list are then stored in a memory and may be tuned if the existing paging signal is lost. Data is desirably transmitted with the local channel lists to permit each paging receiver to locate the list relevant to its geographical area without examining each of the transmitted lists.

5 Claims, 2 Drawing Sheets

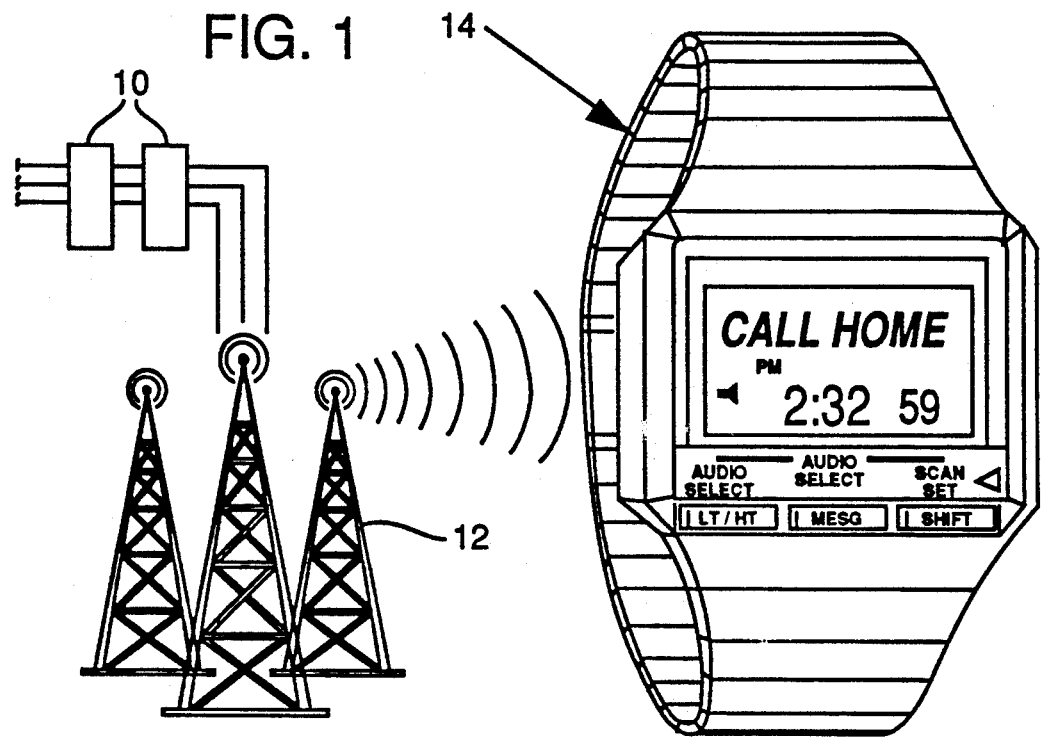
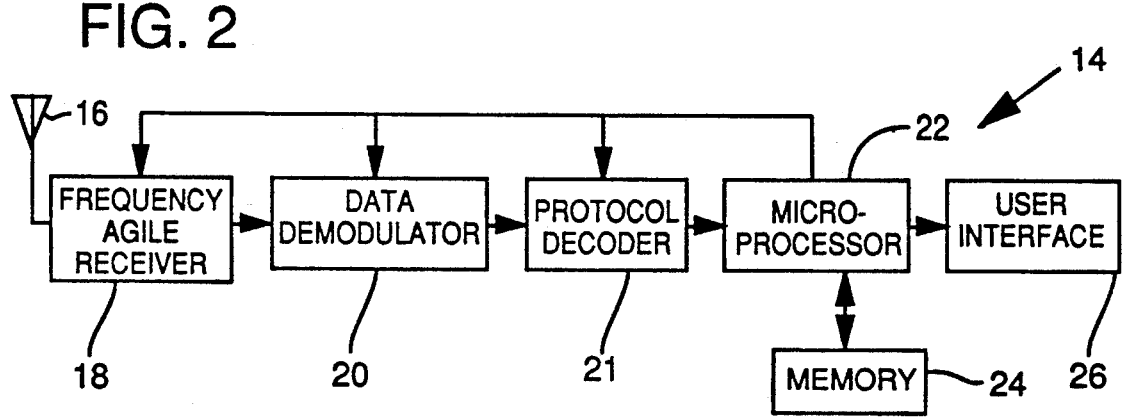
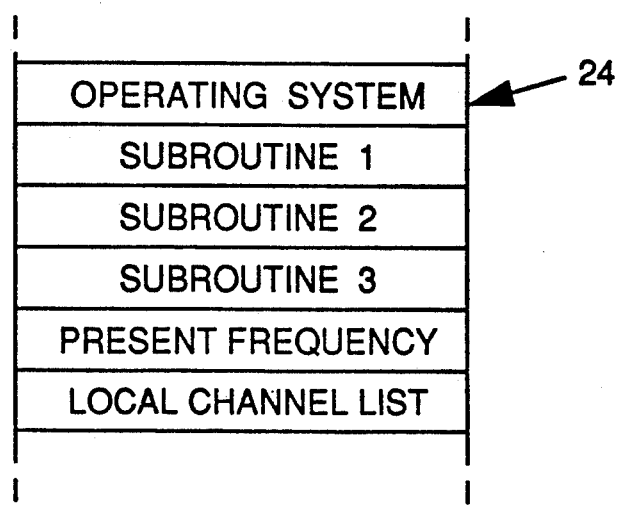

PAGING SYSTEM WITH LOCAL CHANNEL LISTS

This application is a continuation of application Ser. No. 07/367,207, filed Jun. 16, 1989 and now abandoned, which is a continuation-in-part of Ser. No. 07/352,635, filed May 12, 1989 and now U.S. Pat. No. 4,897,835. Ser. No. 07/352,635 is a continuation of abandoned application Ser. No. 07/121,139 filed Nov. 16, 1987 which is a continuation-in-part of Ser. No. 06/802,844, filed Nov. 27, 1985 and now U.S. Pat. No. 4,713,808.

FIELD OF THE INVENTION

The present invention relates to paging systems, and more particularly relates to techniques for limiting the number of channels a paging receiver must scan to find a channel carrying paging data.

BACKGROUND OF THE INVENTION

Paging receivers sometimes include the capability to scan across a predetermined frequency spectrum to locate a channel carrying desired paging data. The scanning operation, however, is energy intensive and reduces the battery life available for the more productive task of receiving pages.

The power consumed by the scanning process is directly related to the number of channels examined. A method has been devised to reduce the number of channels that are examined and thereby increase the battery life. This method involves transmitting with each paging signal a list of paging channels that are in use in the area surrounding the transmitting station. On finding one station, the receiver is thus provided a small local list of other stations that it can examine for data if the original station is lost, obviating the need to scan the entire frequency spectrum.

The above technique works well. However, in certain situations it is impractical for each transmitter to send a unique list of surrounding stations. This is the case when a plurality of geographically diverse stations are provided the same paging data though a network of relay stations.

If only one list is transmitted in such a wide-area network, the receiver may attempt to scan channels that are not in use in the current location. In this event, the list is a detriment to finding paging signals, not an aid. The alternative is to include a comprehensive list that includes all the paging channels throughout the network. However, such a list is likely to be so long as to provide no benefit in locating a suitable paging channel.

It is an object of the present invention to provide local channel lists to paging receivers served by networked paging transmitters.

It is another object of the present invention to broadcast a plurality of local channel lists and to permit individual paging receivers to identify the list pertinent to their particular geographical area.

SUMMARY OF THE INVENTION

According to an aspect of the invention, each paging transmitter in a wide area network broadcasts with its paging signals a plurality of local channel lists, typically one list for each transmitter in the network. When a receiver finds a channel carrying paging data, it identifies which of the plurality of transmitted lists is appropriate for its use by finding the list that references the channel to which the receiver is presently tuned. The channels referenced in the identified list are then stored in a memory in the paging receiver and may be tuned if the existing paging signal is lost.

According to another aspect of the invention, data is transmitted with the local channel lists to permit each paging receiver to locate the list relevant to its geographical location without examining each of the transmitted lists.

The foregoing and additional objects, features and advantages of the present invention will be more readily apparent from the following detailed description thereof, which proceeds with reference to the accompanying drawings.

BRIEF DESCRIPTION OF THE DRAWINGS

FIG. 1 is a schematic block diagram illustrating a paging system that may use the present invention.

FIG. 2 is a schematic block diagram illustrating a wristwatch paging receiver used in the system of FIG. 1.

FIG. 3 is a block diagram illustrating the partial contents of a microprocessor memory used in the paging receiver of FIG. 2.

DETAILED DESCRIPTION

For expository convenience, the present invention will be illustrated with reference to a paging system (the "Gaskill" system) described in U.S. Pat. No. 4,713,808 and in allowed application Ser. No. 07/121,139, later abandoned in favor of Ser. No. 352,635, now U.S. Pat. No. 4,897,835. However, it will be recognized that the invention not so limited. The disclosures of these references are incorporated herein by reference.

As shown in FIG. 1, the Gaskill system includes clearinghouses 10, broadcasting facilities 12 and wristwatch paging receivers 14. The clearinghouses 10 are fully automated centralized facilities which accept messages, validate customer identification, determine message destinations and route messages to the appropriate broadcast facilities for transmission. Callers to the system dial a local clearinghouse telephone number and hear voice prompts which guide them through a simple process for sending messages.

The broadcast facilities 12 are typically conventional FM broadcast stations that carry paging data on subcarriers of their signals. Multiple stations are used for transmission in a given area. Diversity of signals combined with repeated transmission insures the paging subscribers receive their messages with a high degree of reliability.

Figure 5:
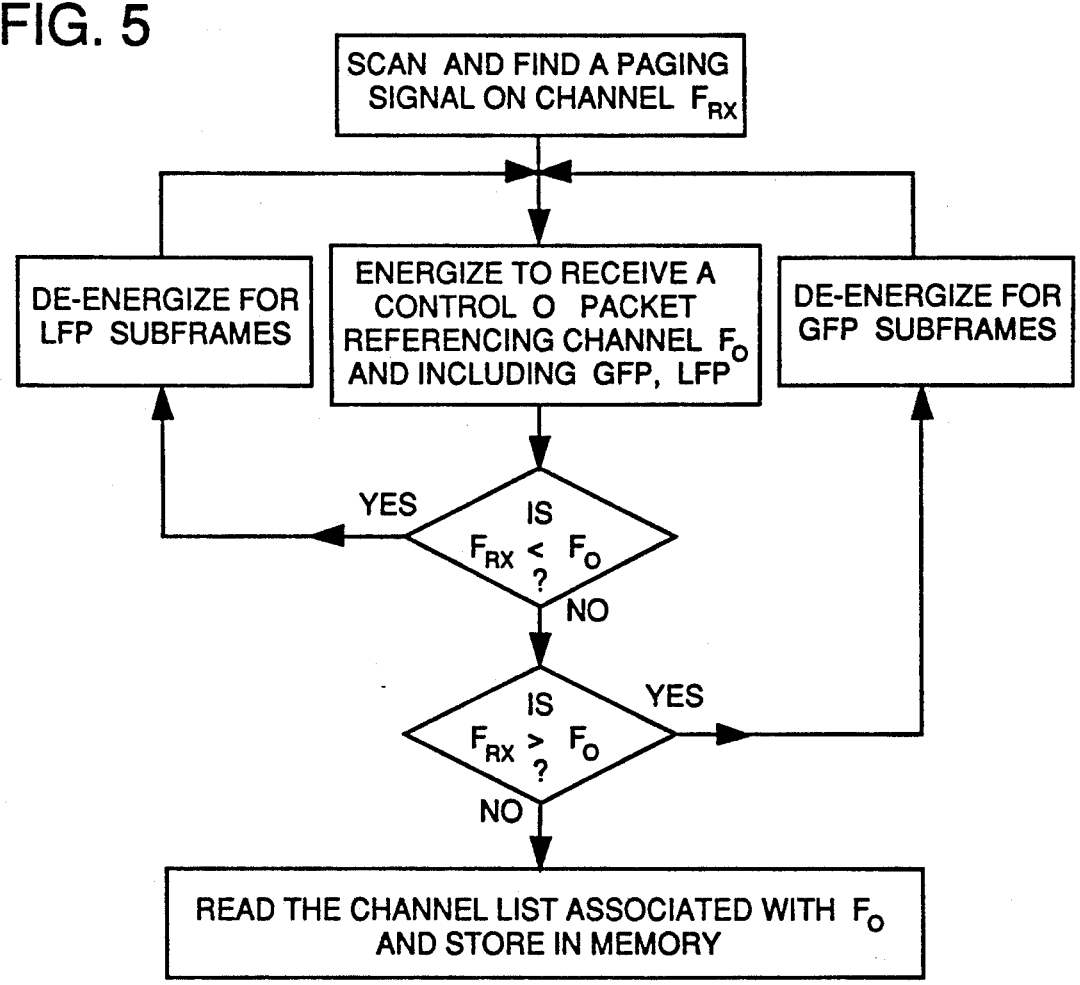
FIG. 5 is a flow chart illustrating a search procedure to locate a channel list relevant to a receiver's current geographical location.

The wristwatch paging receivers 14 are worn by the customers and receive the paging messages broadcast by the broadcast facilities. A block diagram of such a receiver is shown in FIG. 2. The receiver includes an antenna 16, a frequency agile receiver 18, a data demodulator 20, a protocol decoder 21, a microprocessor 22 (with associated memory 24) and a user interface 26. Memory 24 contains various data and programs relating to operation of the watch, such as a subroutine for finding a new station, a subroutine for obtaining a local channel list (such as the subroutine shown in the flow chart of FIG. 5), a datum indicative of the frequency to which the watch is presently tuned, and a local channel list. FIG. 3 illustrates some of the contents of this memory 24.

To review operation of the receiver briefly, antenna 16 receives radio frequency signals in the desired reception band (here 88 to 108 MHz) and couples them to the frequency agile receiver 18. The frequency agile receiver 18 processes the RF signals from the antenna and produces baseband output signals corresponding to a desired FM station within the reception band—typically an FM signal carrying the paging data on an SCA subcarrier thereof. This SCA paging data is detected by the data demodulator 20, decoded by the protocol decoder 21 and is provided to the microprocessor 22 for processing. The microprocessor 22 drives the user interface 26 to alert the user of paging messages.

The paging signals received by the receiver 14 are formatted as sequences of packets. The first three packets of each sequence are termed "control" packets. The first of the control packets is termed the "control 0" packet and contains in this embodiment the date and time and the first entry of a channel list. The second packet is termed the "control 1" packet and contains the other entries in that channel list. The third packet is a spare. These three control packets are followed by 1024 "data" packets in which the paging data is transmitted. Subsequent sequences are similarly formatted but may contain different channel lists in their control packets and typically contain different paging data in their data packets. A new sequence (or "subframe") of 1027 packets is transmitted every 14.0625 seconds.

Figure 4:
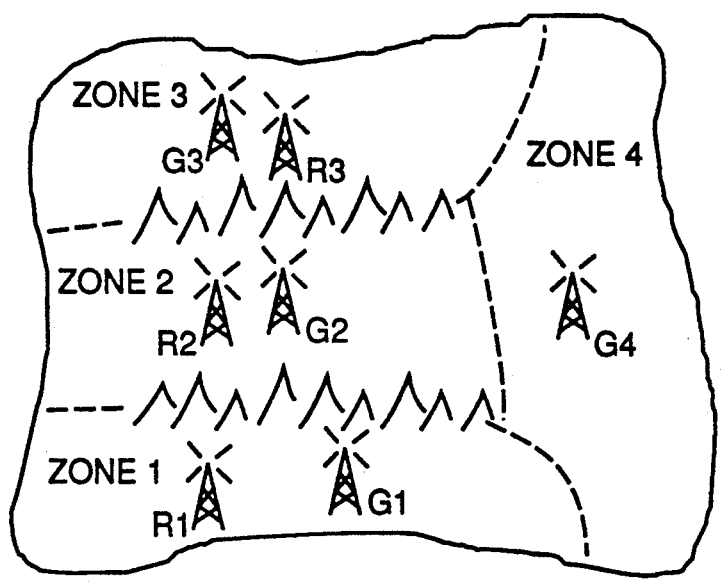
FIG. 4 is a map illustrating the geographical location of a plurality of paging transmitters in an area served by networked paging transmitters.

Before proceeding further, it may be helpful to hypothesize an application in which the present invention may be used. A map showing the distribution of seven paging transmitters over a wide area is shown in FIG. 4. Transmitters R1, R2 and R3 are provided identical paging data over an RF relay network and are collectively termed the "red" paging network. Transmitters G1, G2, G3 and G4 are also provided identical paging data (different from the red paging data) and are collectively termed the "green" paging network. The frequency of the R1 transmitter is lower than the frequency of the R2 transmitter, which in turn is lower than the frequency of the R3 transmitter. The frequencies of transmitters G1, G2, G3 and G4 are similarly ordered.

These seven transmitters are distributed through four geographical zones, which are typically different urban areas. Mountains or other physical barriers separate zones 1 and 2, and also zones 2 and 3, limiting travel therebetween. No such barrier exists between zones 2 and 4.

All the transmitters in the red network are synchronized with each other, beginning transmission of each subframe at the same instant. The green network is also synchronized. However, the red network is not synchronized with the green network—there is a time offset between the beginning of a subframe transmission by the red network and the beginning of a subframe transmission by the green network.

Since the data transmitted by each of the red network stations is the same, the lists of frequencies it transmits are also the same. Similarly with the green stations, although the lists they transmit are different from the lists the red stations transmit. Table I shows the channels transmitted in control packets zero and one (C0 and C1) for three sequences transmitted by the red network transmitters:

TABLE I

|  | C0 | C1 |
|---|---|---|
| t = 0.0 seconds: | R1 | G1 |
| t = 14.0625 seconds: | R2 | G2, G4 |
| t = 28.125 seconds: | R3 | G3 |

To review, the first sequence of packets in Table I indicates that if the receiver is tuned to the R1 channel, it should store in its local list memory 24 the G1 channel, as well as the R1 channel. It can tune to the G1 channel if the R1 channel becomes unreliable. Similarly, if the receiver is tuned to the R2 channel, it should store the G2 and the G3 channels as alternatives. If the receiver is tuned to the R3 channel, it should store the G3 channel as an alternative.

Table II shows a corresponding set of packets containing the frequency lists broadcast with the paging data over the green network:

TABLE II

|  | C0 | C1 |
|---|---|---|
| t = 0.0 seconds: | G1 | R1 |
| t = 14.0625 seconds: | G2 | G4, R2 |
| t = 28.125 seconds: | G3 | R3 |
| t = 42.1875 seconds: | G4 | G2, R2 |

In a first embodiment of the present invention, after a receiver finds a station sending paging signals, it reads the control 0 packet. If the frequency referenced in the control 0 packet matches the frequency to which the receiver is presently tuned, the control 1 packet is read and its contents are stored in the local list memory 24, together with the frequency referenced in the control 0 packet. If the frequencies don't match, the next control 0 packets are read (one at a time) until the frequency referenced int eh control 0 packet matches the presently tuned receiver frequency. The list in the associated control 1 packet is then stored (with the presently tuned frequency) in the local list memory.

Actually, the system operation described above requires that the receiver read control packets zero and one is succession. Since a comparison of the frequency referenced in the control 0 packet with the frequency presently tuned must be performed before the relevance of the control 1 packet can be determined, reading two packets in succession can be impractical. In actual implementation, the preferred embodiment transmits the control 1 packet in the subframe following the control 0 packet with which it is associated.

It will be recognized that if the number of lists is large, there may be a multitude of control 0 packets that must be read to identify the proper list. To reduce the number of reads needed to find the proper list (and to reduce the power consumed in the search process), the frequencies in the control packets are desirably sorted or indexed in a way that permits the search to be optimized.

In a second embodiment of the present invention, an index is transmitted periodically in the control 1 packet. This index lists all of the transmission frequencies used in a network, i.e. $\{f_1, f_2, f_3, f_4, f_5, f_6\}$. The first subframe following the index lists in its control 1 packet the alternative frequencies to be used by receivers presently tuned to frequency $f_1$. Similarly, the second subframe following the index lists in its packet 1 the alternative frequencies to be used by receivers presently tuned to frequency $f_2$. By noting the position of the presently tuned frequency in the index, a receiver knows which subframe to monitor for the relevant list. The receiver can remain deenergized during the intervening subframes.

In this second embodiment, it is important that a newly turned-on receiver be able to find an index packet without listening to all of the control 1 packets. Accordingly, a pointer is desirably sent with each subframe to indicate when (in intervening subframes) the index will next be sent. By this arrangement, a newly turned-on receiver can receive a single packet from a single subframe and deenergize until the next index transmission.

In a third embodiment, an index is not transmitted. Instead, each control 0 packet indicates the number of transmitters in the network. The lists are transmitted in order determined by their first frequency. By knowing how many lists (i.e. transmitters) are being used, and by noting which list is presently being sent, the receiver can approximate when the list it needs may be sent.

To illustrate, assume a network includes ten transmitters, at 88.7, 92.1, 94.3, 95.1, 96.7, 98.3, 100.1, 101.1, 103.5 and 107.9 MHz. If a newly turned-on receiver is tuned to the 103.5 MHz transmitter and the first subframe received contains the channel list used by receivers tuned to the 94.3 MHz transmitter, the receiver may approximate when it should turn on next by assuming the transmitters are uniformly distributed throughout the 20 MHz frequency spectrum. Since the receiver is tuned 9.2 MHz above the frequency of the channel list presently being transmitted, it may compute that it should deenergize for the next three subframes (which it assumes may contain lists for receivers operating at the 96.3, 98.3 and 100.3 MHz transmission frequencies) and monitor the fourth following subframe. The list transmitted at this fourth following subframe actually contains the list for 100.1 MHz, but since this is still below the frequency to which the receiver is presently tuned, the receiver tries again the next subframe (which includes the list for the 101.1 MHz transmitter) and again the following subframe, until it finds the list for the desired 103.5 MHz transmitter. (If, instead of underestimating the number of intervening subframes, the receiver overestimated, it could deenergize for eight subframes [two less than the total number of ten] and try again to receive the proper list.)

A fourth embodiment uses a binary search procedure to locate the correct list from those transmitted. (A binary search basically works to halve the remaining number of possibilities each time a read is made.) To accomplish a binary search, the receiver must again have some data relating to the number of lists being transmitted. In this embodiment, this data takes the form of a "lesser frequency pointer" (LFP) and a "greater frequency pointer" (GFP) transmitted with each control 0 packet and to which the receiver can refer in deciding which subsequent subframe to monitor.

If the frequency in the control- 0 packet is less than the currently tuned frequency, the LFP indicates how many subframes the receiver can remain idle before energizing to receive a control 0 packet that references a frequency less than that referenced in the current control 0 packet. If the currently tuned frequency is greater than the frequency in the control 0 packet, the GFP indicates how many subframes the receiver can remain idle before energizing to receive a control 0 packet that references a frequency greater than that referenced in the current control 0 packet. A zero in the LFP means there is no lower frequency than that referenced in the control 0 packet presently being transmitted. A zero in the GFP similarly means there is no greater frequency than that referenced in the control 0 packet presently being transmitted.

Table III shows the control packets continuously transmitted by the stations in the red network in this embodiments:

TABLE III

| C0 | | C1 |
|---|---|---|
| R2 | 1 4 | |
| R1 | 0 3 | G2, G4 |
| R1 | 0 2 | G1 |
| R1 | 0 1 | G1 |
| R3 | 1 0 | G1 |
| • | | G3 |
| • | | • |
| • | | • |
| • | | |
| • | | |

The two numbers in the control 0 packet are the LFP and GFP, respectively.

Table IV shows the control packets continuously transmitted by the stations in the green network:

TABLE IV

| C0 | | C1 |
|---|---|---|
| G1 | 0 3 | |
| G1 | 0 2 | R1 |
| G1 | 0 1 | R1 |
| G2 | 3 1 | R1 |
| G3 | 2 1 | G4, R2 |
| G4 | 1 0 | R3 |
| • | | G2, R2 |
| • | | • |
| • | | • |
| • | | |

If one station serves a more populated area than the others, it may be listed int eh control 0 packets more frequently than the other stations. This provides a greater chance of a receiver finding the correct packet (and thus the correct list) on the first read and thereby decreases the search time for heavily populated areas. In Tables III and IV, zone 1 is assumed to be more populous than the other zones and its transmitters are thus listed more frequently in the control 0 packets.

To illustrate operation of this fourth embodiment, assume a receiver is operating in zone 2. After a scan of all frequencies, station R2 is found. Further assume that the first control 0 packet read from this station is the second of the three R1 packets listed in Table III above. Since the receiver's currently tuned frequency (R2) is greater than the, frequency referenced in the control 0 packet (R1) (as noted earlier, the frequencies are ordered), the receiver looks to the GFP pointer for instructions. The GFP pointer is "2", indicating that the next control 0 packet the receiver should read is two subframes away. When the receiver next energizes and reads this subframe, it finds the control 0 packet references station R3. Since the currently tuned frequency (R2) is less than the frequency referenced in the control 0 packet (R3), the LFP is followed. The LFP is "1", indicating that the receiver should read the control 0 packet one subframe away. When the receiver next energizes and reads this control packet, it finds it references the currently tuned frequency (R2) and is thus accepted as the proper control packet. The following subframe's control 1 packet is then read, since the control 1 packet is offset one subframe from the control 0 packet to which it relates. This packet contains the rest of the proper list for R2 (i.e. G2 and G4). The local list of frequencies for the receiver in zone 2 is thus R2, G2 and G4. The foregoing sequence of steps is illustrated by the flow chart of FIG. 5.

Once a receiver has loaded a local channel list into its memory 24, it continues to operate on the original channel until there is a failure in reception, such as receipt of a packet with uncorrectable errors. When such event occurs, the receiver tunes other channels in the local list until good data is again received.

Normally, the stations in a common area do not operate synchronously—there is a fixed offset period between the beginning of the control 0 packet from one station and the beginning of the control 0 packet from another. The channel list is ordered so that if the current frequency fails, the other channels listed can be sequentially monitored all within the 1.875 minutes of a single frame. However, with networked stations, several transmitters in a zone may be operating synchronously. For example, in zone 2, transmitters G2 and G4 operate synchronously. Consequently, the receiver can tune only one of these stations.

To address this problem, a further aspect of the present invention is to organize the local channel list as a series of columns, as shown in Table V below:

TABLE V

| R2 | G2 |
|----|----|
|    | G4 |

Channels carrying synchronous transmissions are put into the same column. The channels are ordered in increasing offset for a 1.875 minute frame from left to right. As the receiver tunes through the local channel list for a paging channel, it tunes to the top station in each column. If no paging signal (or a corrupted paging signal) is found in a column with two or more channels, the top station is put at the bottom of the column and the station next to the top is pushed to the top. Thus, the next cycle through the list, the receiver will tune a different channel. By this arrangement, successive tuning cycles through the local channel list examine different ones of the synchronously operated stations.

Having described and illustrated the principles of our invention with reference to a preferred embodiment and several variations thereon, it will be apparent that the invention can be modified in arrangement and detail without departing from such principles. Accordingly, we claim as our invention all such embodiments as may come within the scope and spirit of the following claims and equivalents thereto.

We claim:

1. In a paging system which includes
a plurality of individually addressable mobile paging radio receivers for receiving signals containing paging messages, each of said pagers having a local channel list through which said receiver scans to find a particular channel on which it can reliably receive said paging messages, each of said receivers storing information identifying said particular channel on which said receiver is operating at any particular time, and
a plurality of transmitters, each of which transmits the same data stream including paging messages and a plurality of local channel lists, one of which includes the transmitter channel on which the particular transmitter is operating,
the method of operating said paging receivers which comprises:
receiving said plurality of transmitted local channel lists and utilizing said transmitted local channel lists in conjunction with said stored particular channel information which indicates the particular channel to which said receiver is presently tuned to permit said receiver to ignore certain local channel lists and to receiver and store one local channel list transmission relevant thereto.

2. In a paging system which includes
a plurality of individually addressable mobile paging radio receivers for receiving signals containing paging messages, each of said pagers having a stored local channel list through which said receiver scans to find a channel on which it can reliably receive said paging messages, each of said receivers storing information indicating the particular channel on which said receiver is operating at any particular time, and
a plurality of transmitters, each of which transmits a data stream including paging messages and a plurality of local channel lists each of said transmitters transmitting the same data stream, the data stream of each of said transmitters including at least two local channel lists, each of said tow local channel lists including the channel of one of said transmitters,
the method of operating said paging receivers which comprises:
energizing said receivers to receive said plurality of channel lists;
selecting one of said channel lists based on the channel to which the paging receiver is presently tuned; and
operating said receiver based upon said selected channel list.

3. The method of claim 2 in which said channel lists comprise entries in a local channel list index.

4. The method of claim 3 in which said method additionally includes using said channel list to determine when next to energize depending on the relationship of the information in the channel to which the receiver is presently tuned.

5. The method of claim 3 in which the energizing step additionally includes using said channel list to determine when next to energize depending on the relationship of the data in said channel list to the channel to which the receiver is presently tuned.

* * * * *